(12) United States Patent
Dufour et al.

(10) Patent No.: US 6,336,856 B1
(45) Date of Patent: Jan. 8, 2002

(54) LOIN PULLER FOR TRIMMING OFF THE FAT FROM THE LOIN OF A CARCASS-HALF

(75) Inventors: Yvon Dufour; Jean-Guy Roy, both of St-Anselme; Patrick Fauret, Outremont, all of (CA)

(73) Assignee: G.E. Leblanc Inc., St-Anselme (CA)

( * ) Notice: Subject to any disclaimer, the term of this patent is extended or adjusted under 35 U.S.C. 154(b) by 0 days.

(21) Appl. No.: 09/610,468

(22) Filed: Jul. 5, 2000

(30) Foreign Application Priority Data

Jul. 9, 1999 (CA) .......................................... 2 277 693

(51) Int. Cl.[7] .............................................. A22C 18/00
(52) U.S. Cl. ........................................ 452/171; 452/136
(58) Field of Search ................................ 452/171, 136

(56) References Cited

U.S. PATENT DOCUMENTS

| | | | | |
|---|---|---|---|---|
| 3,605,178 A | * | 9/1971 | Hoffmann | 452/171 |
| RE28,508 E | * | 8/1975 | Neebel et al. | 452/171 |
| 5,090,939 A | | 2/1992 | Leblanc | |
| 5,226,850 A | * | 7/1993 | Klaassen | 452/171 |
| 5,234,371 A | * | 8/1993 | Andre et al. | 452/171 |
| 5,295,898 A | | 3/1994 | Andre | |
| 6,089,968 A | * | 7/2000 | Amdre et al. | 452/171 |
| 6,155,919 A | * | 12/2000 | Haagensen et al. | 452/171 |

* cited by examiner

*Primary Examiner*—Willis Little
(74) *Attorney, Agent, or Firm*—Robic (57) ABSTRACT

A loin puller for processing a carcass-half comprising a loin and a flank partially separated by cutting, the loin comprising a layer fat to be trimmed off. The machine has a frame which is fixed an elongated rectilinear working surface intended to receive and support the loin of the carcass-half to be processed. A conveying system is mounted onto the frame above the working surface for engaging and pressing the loin and moving it together with the flank connected thereto up to a cutting zone. An arcuate cutting blade is mounted to the frame in the cutting zone for engaging the loin when the frame is moved by the conveying system and for cutting the layer fat to be trimmed off the same. Advantageously, the frame is devised to let the flank fall down from the working surface while the carcass-half is moved by the conveying system. As a result, more visibility is left for evaluating an optimum position for the cutting blade.

17 Claims, 9 Drawing Sheets

LOIN PULLER FOR TRIMMING OFF THE FAT FROM THE LOIN OF A CARCASS-HALF

FIELD OF THE INVENTION

The present invention relates to a machine hereinafter called "loin puller" for trimming off the fat from the back of a loin, in particular a pork loin, without having to completely cut and separate the loin from the central part of the carcass-half of the animal.

BACKGROUND OF THE INVENTION

Figure 1:
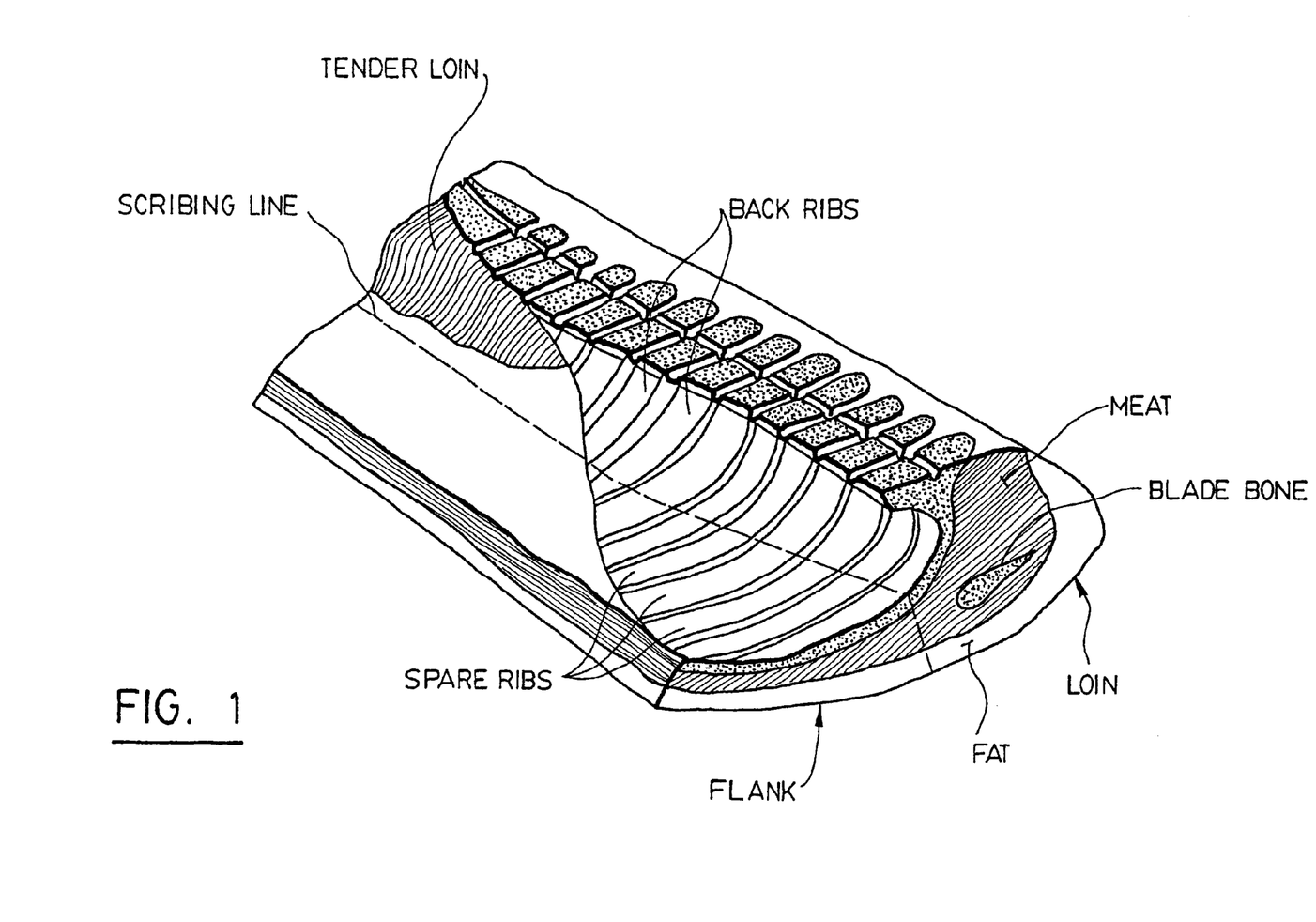
FIG. 1 is a perspective view of a carcass-half showing the main parts of it, to which reference has been made hereinabove.

As shown in FIG. 1 of the accompanying drawings, the central part of the carcass-half of a piece of meat comprises two main parts respectively called "loin" and "flank". The loin is adjacent to the cut portion of the spinal column. The front portion of the loin contains ribs which are called "back ribs" after processing. In the rear portion of the loin is located the tender loin. The flank which is also called "belly", is the part which is adjacent to the loin at the opposite of the spinal column. The ends of the ribs which extend along the flank can altogether be separated from the same to form "spare ribs", or they can be removed individually. After removal of the ribs, the flank is mainly used to prepare bacon. The whole carcass-half is covered by an external layer of fat which extends under the loin and flank. The thickness of this layer of fat depends on several parameters including, inter alia, the size, the origin and the nutrition of the animal. This fat is the one that can be found in bacon. Therefore, it is important from a practical standpoint to keep a proper amount of fat with the flank prior to cutting the same. However, it is important to remove same of the fat extending under the loin to avoid an over load of fat in the final product.

For trimming the fat off the loin, use is made of automatized machines called "loin pullers", which are used in the cutting sections of the industrial slaughter houses.

Prior to processing a loin in a loin puller, it is of course necessary to separate it from the flank. So far, there have been two different methods of doing so.

The first method, called "Canadian cut", consists in completely separating the flank from the loin by completely cutting the carcass-half according to a suitable cutting line which may vary depending on the need. An example of such a cutting line is shown in dotted lines in FIG. 1. Such a cutting can be carried out either manually or by means of another machine located upstream the loin puller or within the same. Once separated, the flank can be directed towards another machine or another working table specially adapted for this purpose, in order to separate the spare ribs. On the other hand, the loin is introduced into the loin puller, in order to trim off its fat.

A non-limitative example of loin puller specially adapted for processing loins after full separation from the adjacent flanks is disclosed in U.S. Pat. No. 5,090,939 issued on Feb. 25, 1992 in the name of the Applicant.

The second method, called "American cut", consists in cutting (scribing) only the internal part of the carcass-half, that is the upper part of the carcass-half shown in FIG. 1, following the same type of cutting line as above, except for the fat. As a result, the layer of fat remains uncut and maintains altogether the loin and the flank. Then, both of them may be transferred together to a working table where the loin is processed to remove part of the layer of fat from the loin. The main advantage of this method is that it makes it possible to recover part of the fat and meat of the loin together with the flank, which part would otherwise have been left onto the loin and trimmed off by a cutting blade. Usually, this method of processing carcass-halves is carried out manually, even though industrial machines have been proposed to do it.

Thus, for example, U.S. Pat. No. 5,295,898 issued on Mar. $2^{nd}$, 1994 in the name of ACRALOC CORP., discloses a loin puller especially adapted for processing carcass-halves having been subjected to an American cut. In this loin puller, each carcass-half is moved by two conveyors extending in parallel relationship towards a cutting zone where an arcuate blade which is preferably heated and whose height and curvature are adjustable, is positioned above the first conveyor supporting the loin for processing the same and trimming off its layer of fat. While the fat of the loin is cut, the flank is moved at the same speed along the second conveyor, which is positioned at the same level as the one of the first conveyor and may include another cutting zone where another knife cut the extra fat extending under the flank (see FIG. 3c of this patent).

In the loin puller disclosed in U.S. Pat. No. 5,295,898 as well as in all the other existing loin pullers used for processing carcass-halves having been subjected to an American cut, the loin and flank are maintained altogether in a same horizontal plane. Therefore, an operator provided with manual control means must very carefully follow the movement of the carcass-half to determine the optimum scribing line and to adjust accordingly the scribing saw while simultaneously adjusting the height of the cutting blade. Such requires much dexterity from the operator who must determine the scribing line and who has very few visual information to evaluate the thickness of the layer of fat and thus to adjust the height of the cutting blade. Indeed, the operator has no visual access to the layer of fat under the loin after the loin has been engaged by the cutting blade. The operator has also poor visual access to evaluate the position of the cutting blade relative to the ribs, because of the presence of the flank in horizontal position adjacent to the loin. As a result, the operating speed of the machine is reduced as compared to the loin pullers used for processing loins having been subjected to a Canadian cut.

A main object of the present invention is to solve the above mentioned problem by providing a loin puller which, thanks to its structure, permits to process carcass-halves having been subjected to an American cut in view of trimming the fat off the loin while simultaneously permitting to the operator or to a detection system to determine the thickness of the back ribs on the loin and the thickness of the meat, and thus to evaluate the upper level of the layer of fat under the loin, such allowing an evaluation of the optimum height for positioning the arcuate blade for trimming off the fat with or without the adjacent lean meat depending on the user's requirement.

The invention is based on the discovery that, after scribing, by letting the flank fold down and hang on one side of the loin while said loin is moved by the conveyor towards the cutting zone instead of supporting the flank by means of another conveyor, it becomes possible for the operator or the detection system used for controlling the blade, to determine the level of the layer of fat under the loin and/or the thickness of the ribs and/or the position of the lean meat along the same, such allowing optimum adjustment of the position of the cutting blade.

Therefore, the present invention provides a loin puller for processing a carcass-half comprising a loin and a flank partially separated by scribing, said loin comprising a layer of fat of a given thickness to be trimmed off and lean meat adjacent said layer of fat. This loin puller is of the type comprising:

a frame;

an elongated rectilinear working surface fixed to the frame and intended to receive and support the loin of the carcass-half to be processed;

a conveying system mounted onto the frame above the working surface for engaging the loin, pressing said loin and moving said loin together with the flank connected thereto towards a cutting zone; and an arcuate cutting blade mounted to the frame in the cutting zone for engaging the loin when the same is moved by the conveying system and cutting the layer of fat to be trimmed off the same, with or without lean meat on the trimmed fat attached to the flank.

In accordance with the invention, this loin puller is improved as compared to the existing loin puller in that its frame is devised to let the flank fold down and hang from the working surface while the carcass-half is moved by the conveying system, whereby more visibility is left for an operator to evaluate an optimum cutting position for the cutting blade and more spacing is left between the cut ribs once the flank is folded down from the loin, thereby making the loin puller operable manually or automatically from any side and position along the frame.

This invention is quite simple and very efficient, as tests carried out by the Applicant have shown it. The invention is also interesting in that it can be carried out by properly adapting the structure of existing loin pullers, like the one disclosed in U.S. Pat. No. 5,090,939 mentioned hereinabove, in the name of the Applicant.

Of course, the frame of the loin puller must be devised to allow the flank to fold down and move together with the loin to which it is attached.

Advantageously, guides in the form of plates and/or rigid tubes of metal can be provided at the inlet and along the machines to force the flank to fold down and hang relative to the loin. Such may be necessary when the carcass-half to be processed is very cold and rigidified by cooling or for other reasons.

BRIEF DESCRIPTION OF THE DRAWINGS

The invention will be better understood upon reading the following non-restrictive description of the preferred embodiment thereof, made with reference to the accompanying drawings in which.

DETAILED DESCRIPTION OF THE INVENTION

Figure 2:
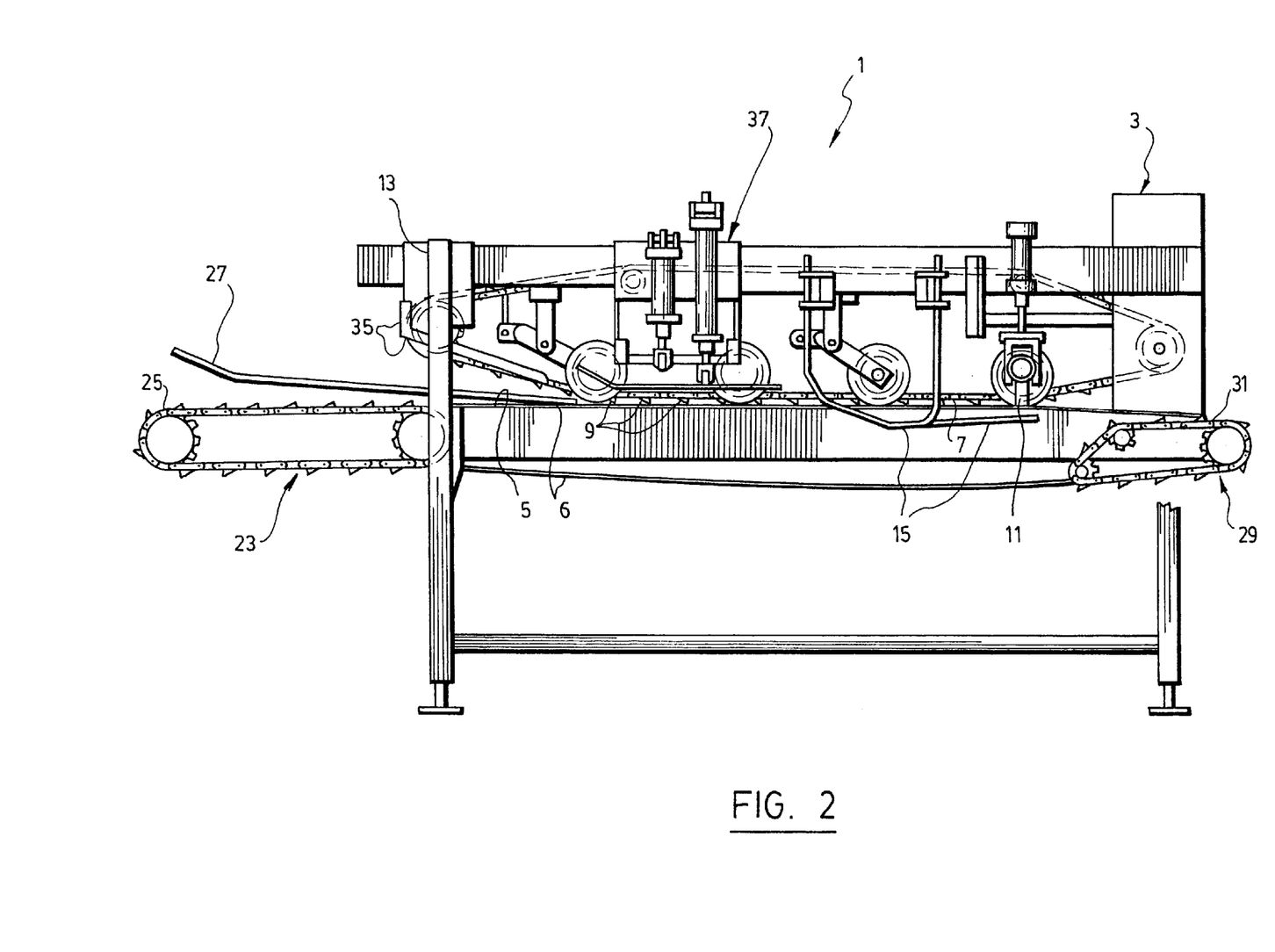
FIG. 2 is a side elevational view of a loin puller for trimming off the fat with or without the lean meat from the loin of a carcass-half according to a preferred embodiment of the invention.
Figure 3:
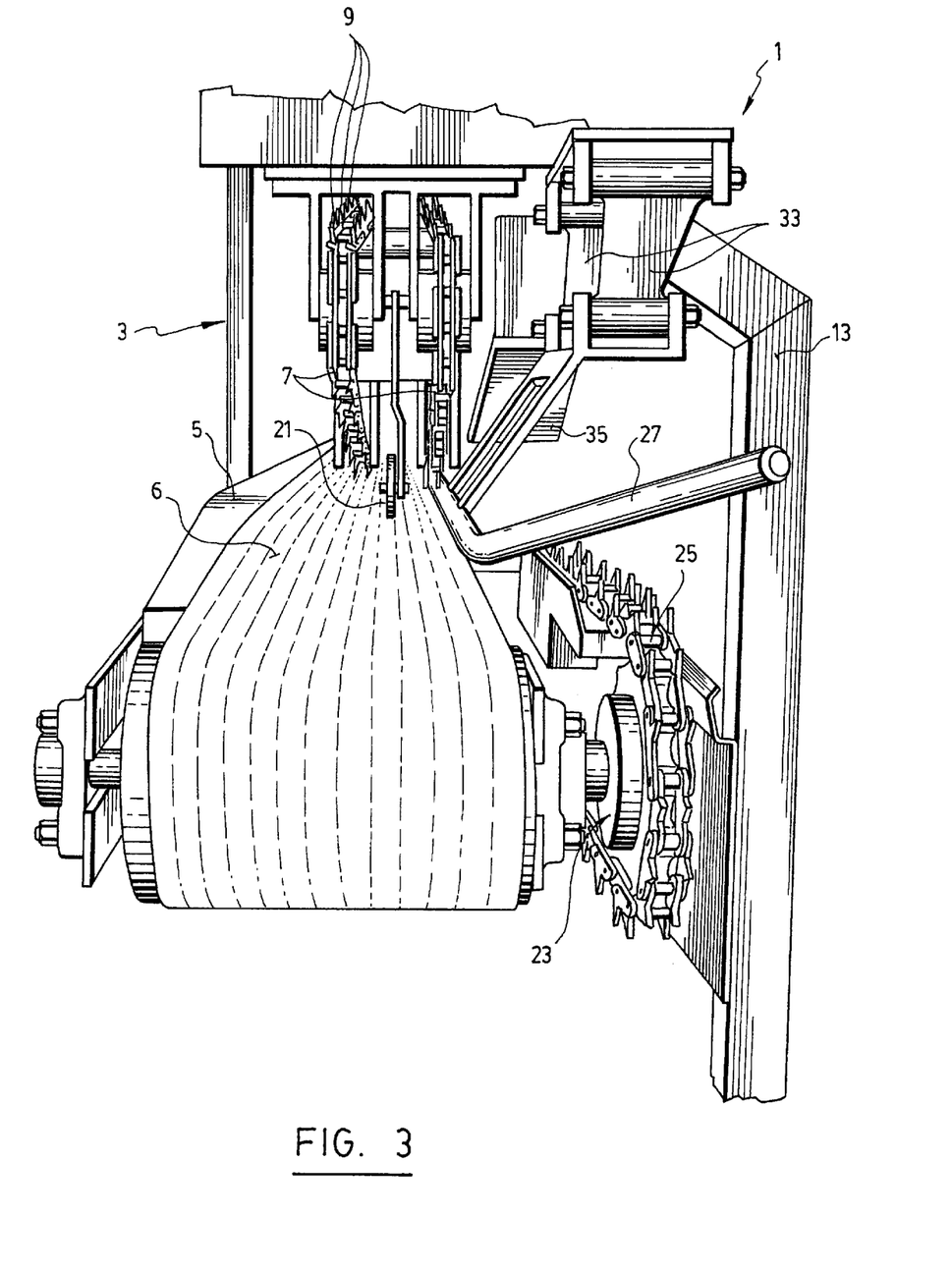
FIG. 3 is a front view of the inlet of the loin puller shown in FIG. 2.
Figure 4:
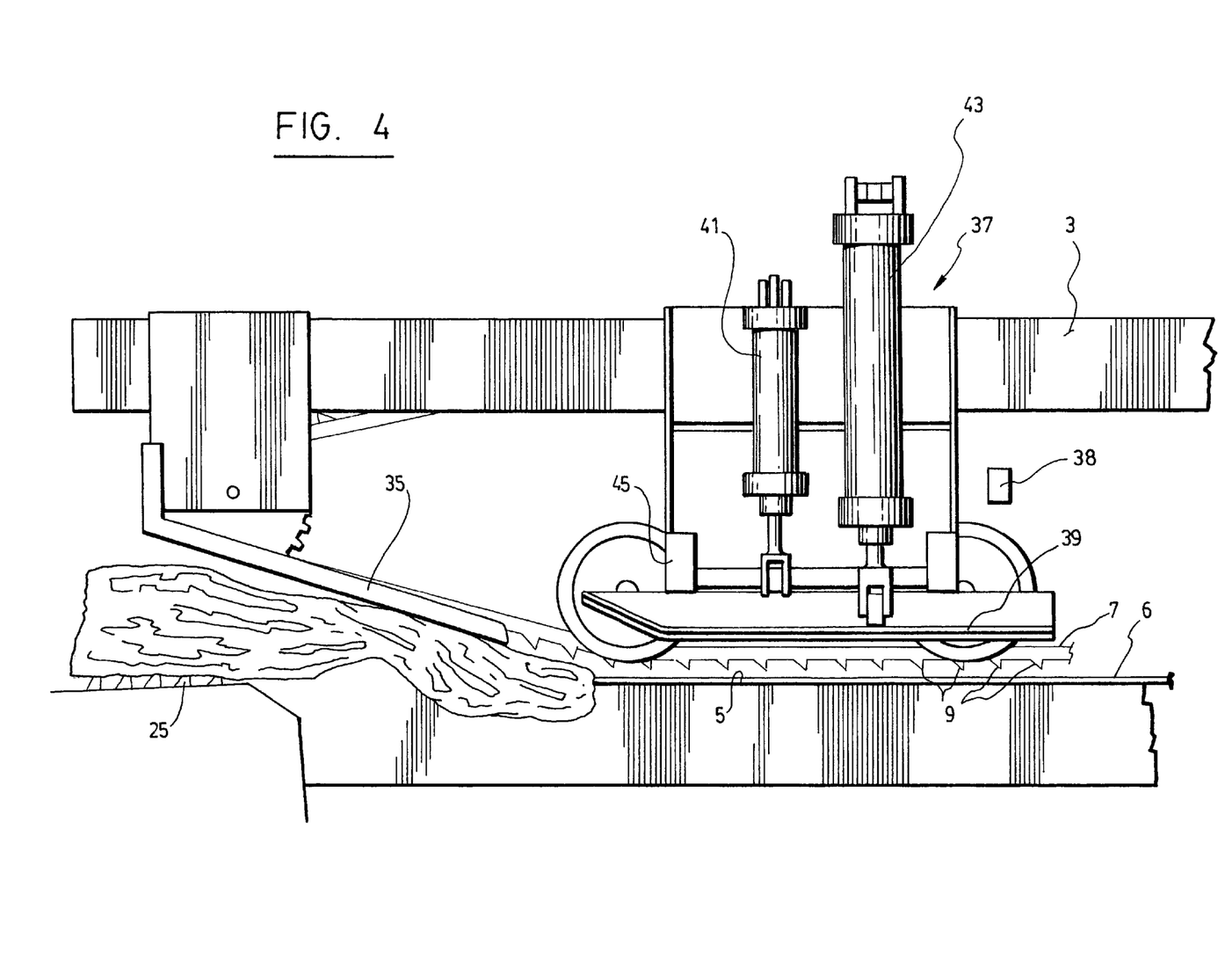
FIG. 4 is a side elevational view of the portion of the loin puller shown in FIG. 2, where is located the rigid guiding plate and the pivotable plate positioned downstream the rigid plate for giving a knock to the flank and folding it.
Figure 5A:
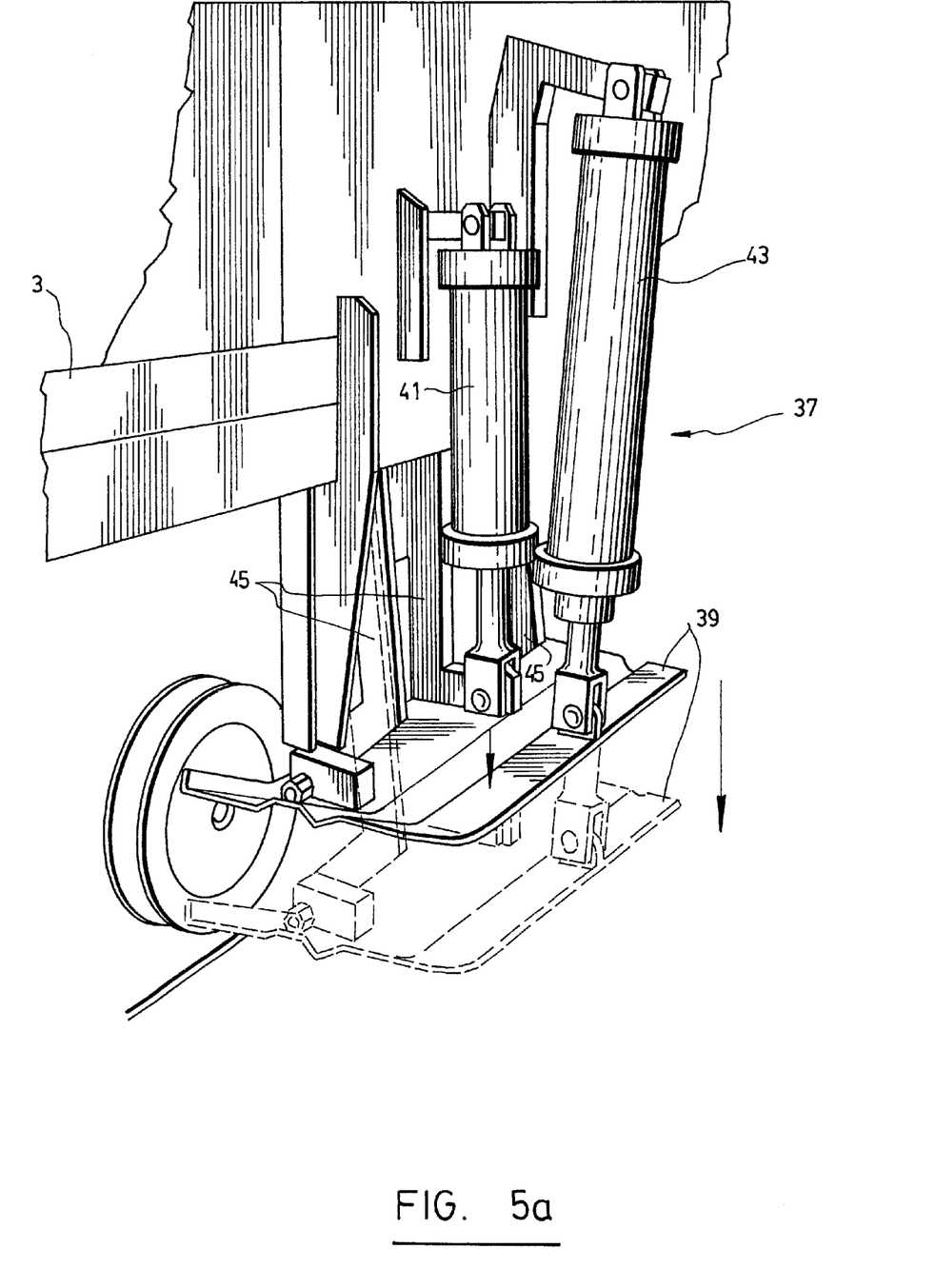
FIGS. 5a and 5b are perspective views showing in detail the operation of the pivotable plate used for giving a knock to the flank and folding it.
Figure 5B:
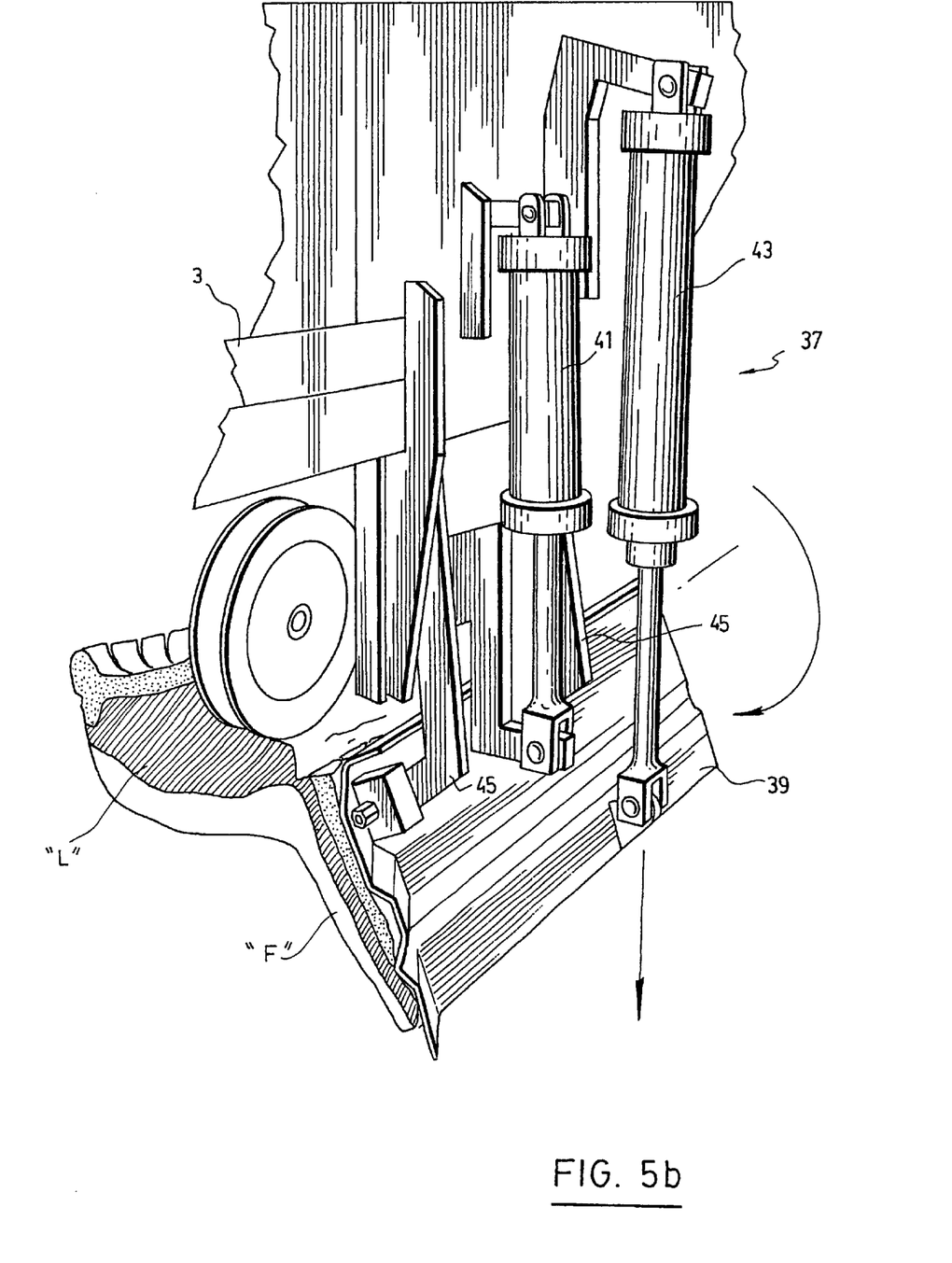
Figure 6:
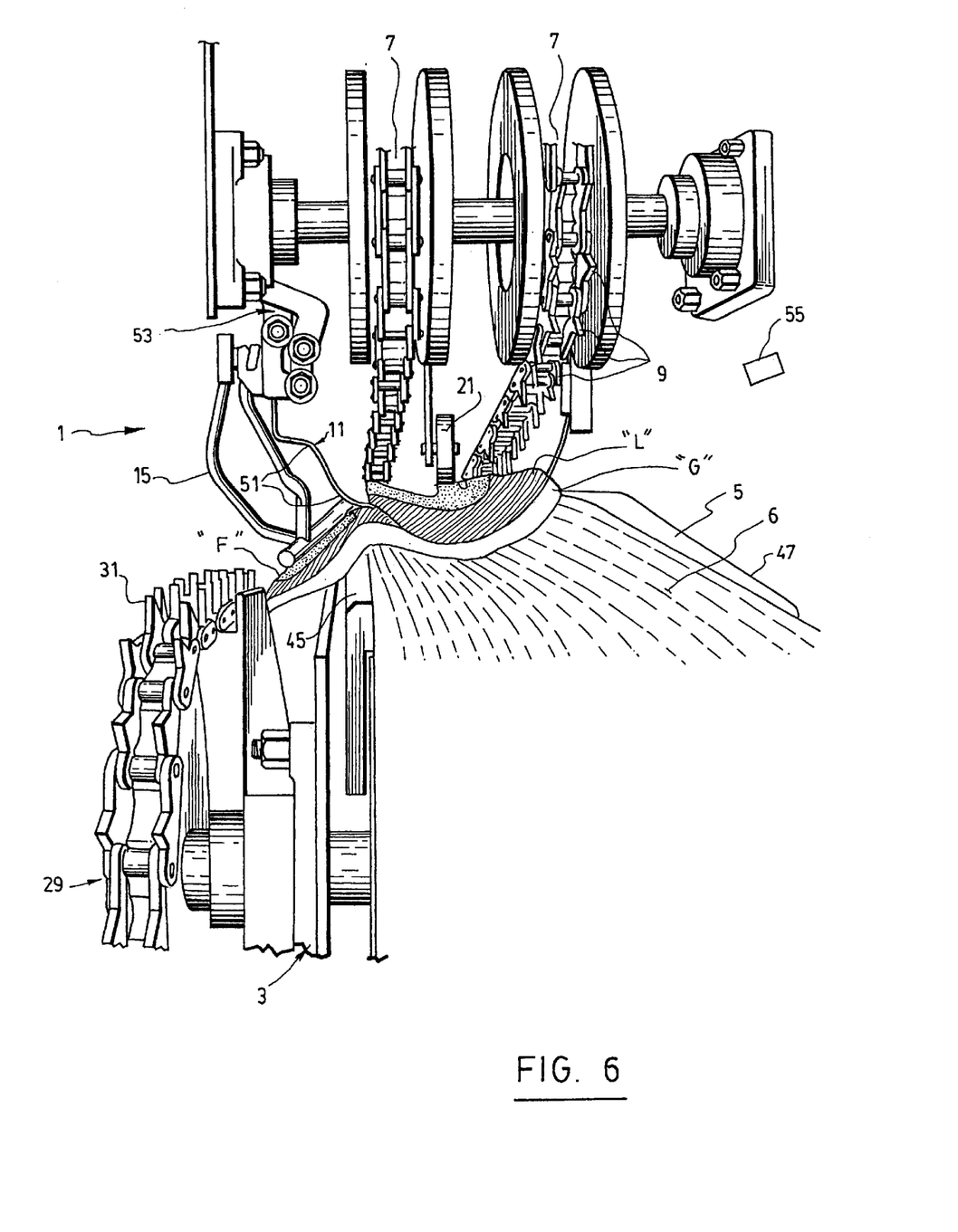
FIG. 6 is a rear view of the outlet of the loin puller shown in FIG. 2, said figure showing the cutting blade in engaged cutting position in the loin of a carcass-half.

The loin puller according to the preferred embodiment of the invention as shown in FIGS. 2 to 6 comprises a frame 3 to which is fixed an elongated rectilinear working surface 5 preferably having a concave cross-section. An endless belt 6 is mounted onto the working surface 5 for facilitating the conveying of the carcass-halves along the working surface. As shown in FIGS. 3 and 6, several retractable rollers 21 held in lower position by means of return springs or cylinders are fixed to the frame above the belt for applying a pressure onto the same and thus maintaining the belt in contact with the working surface before and after passage of each carcass-half. The working surface 5 is intended to receive and support the loin "L" of a carcass-half to be processed, with the layer of fat "G" in downwards position.

A conveying system comprising two endless chains 7 each provided with teeth 9, is mounted onto the frame above the working surface for engaging the loin L, pressing on the same and moving it together with the flank F connected thereto toward a cutting zone located downstream, where an arcuate cutting blade 11 whose height and curvature are adjustable, is positioned to engage the loin while the same is moving and to cut the layer of fat G to be trimmed from the same. This conveying system and its operation in synchronism with the belt 6 mounted onto the working surface 5 are well known in the art. In this connection, reference can be made to the content of the disclosure of U.S. Pat. No. 5,090,939 and to all the other patents that were cited during its examination. The method used for cutting the layer of fat by means of an arcuate cutting blade 11 is also well known in this field. In this connection, it is worth reminding that such a cutting can be made manually via means controlled by an operator for adjusting the cutting blade as a function of the evaluation of the thickness of the layer of fat to be trimmed of the loin. Alternatively, such method can be carried out automatically by the combination of a detection system with means controlled by said detection system for adjusting the cutting blade as a function of the evaluation of the main parameters from trimming off the loin. Once again, reference can be made to the description of U.S. Pat. No. 5,090,939.

Figure 8:
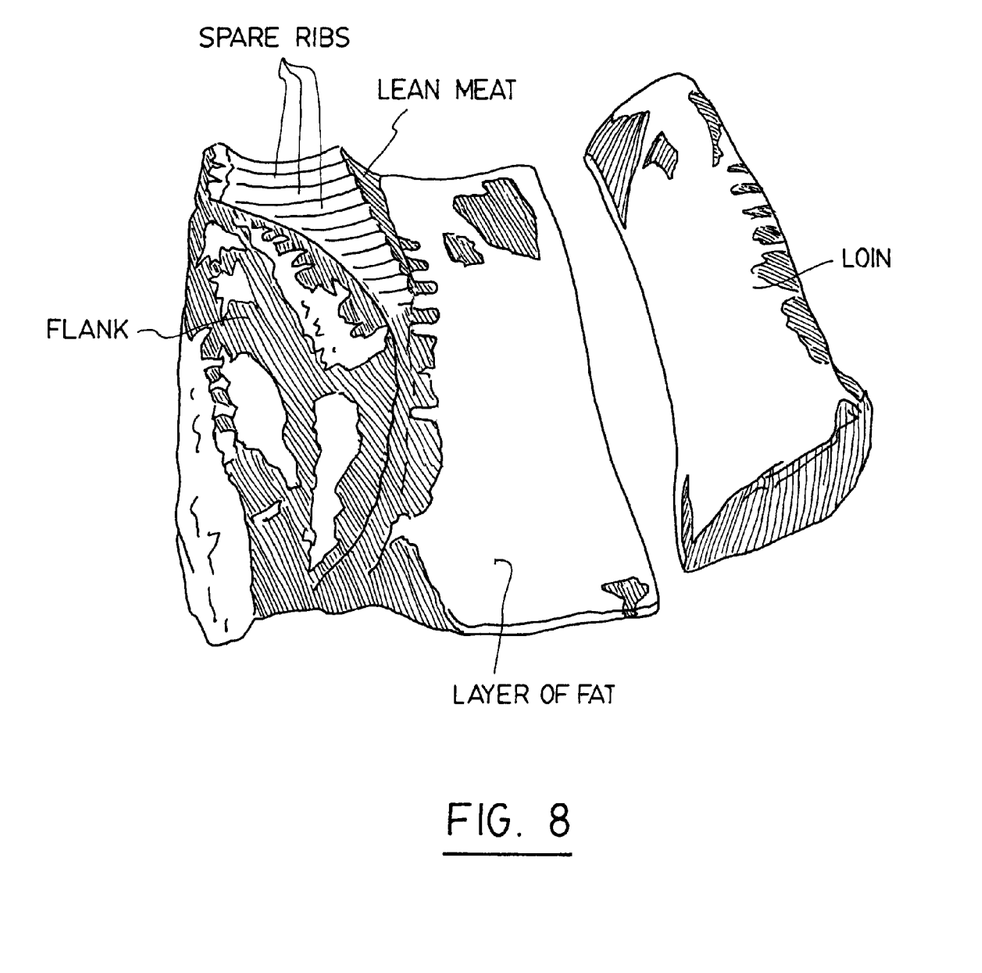
FIG. 8 is a perspective view similar to the one of FIG. 1, showing a carcass-half after the loin has been cut.

As previously indicated, the present invention lies in that the loin puller 1 and more specifically its frame 3, are devised to let the flank fold down and hang from the working surface 5 while the carcass-half is moved by the conveying system. For this purpose, the frame 3 is provided with supporting arches 13 leaving a lateral free space adjacent one side of the working surface 5 (see FIG. 3). The flank which hangs down with respect to the loin L as clearly shown in FIG. 6, provides better lateral visibility and thus permits to the operator or to the detection system to better determine the thickness of the back ribs on the loin and the thickness of the meat, and thus to evaluate the upper level of the layer of fat under the loin, such allowing an evaluation of the optimum height for positioning the arcuate blade for trimming off the fat with or without leaving, by choice, lean meat on the trimmed fat still attached to the flank (see FIG. 8). Moreover, the flank, once it is folded down, leaves enough space between the back ribs and spare ribs to make it possible for the loin puller to be operated manually or automatically from any side and position along the frame.

For facilitating the operation of the loin puller, and more particularly the introduction and exit of the carcass-halves, an inlet conveyor 23 comprising an endless chain 25 provided with teeth, is positioned at the inlet of the loin puller 1 for supporting the flank when the carcass enters the loin puller. A guiding rod 27 is also positioned at the inlet of the loin puller for facilitating positioning of the loin on the working surface. An outlet conveyor 29 comprising an endless chain 31 provided with teeth, is positioned at the outlet of the loin puller for lifting up the flank and supporting the same when the carcass-half exits the loin puller. As is shown, the guiding rod 27 preferably consists of an horizontally extending rigid tube connected to the frame by means of a set of pivoting arms 33 forming a deformable parallelogram in order to be able to retract in a vertical plane depending on the thickness of the loin. Moreover, a guiding plate 35 is mounted in a rigid manner to the frame 3 above the inlet conveyor 23 upstream the same. As is shown, this guiding plate 35 extends at an angle in order to start folding the flank down from the carcass-half while said carcass-half is moved by the conveying system.

Because of the refrigeration of the carcass-halves to be processed or for any other reason, the flank may sometimes remain in the same plane as the loin to which it is attached. To force the flank to fold down and hang, mechanical means 37 may be mounted upstream the cutting knife. These means 37 are controlled by a detector 38 (see FIG. 4) for giving a knock onto the flank of the carcass-half while said carcass-half is moved by the conveying system. The knock which is so given, forces the flank to fold down and hang. The mechanical means 37 for giving a knock to the flank are shown in greater details in FIGS. 4, 5a and 5b. They preferably comprise a pivotable plate 39 mounted onto the frame 3 and at least one jack 41 and/or 43 mounted between the plate 39 and the frame 3 for moving the plate down and folding it from an horizontal position (see FIGS. 4 and 5a) down to an inclined position (see FIG. 5b) as soon as a signal is received from the detector 38 (see FIG. 4). In the illustrated embodiment, the plate 39 is mounted onto a piece 45 which is itself slidably mounted onto the frame 3 so as to be movable up and down. The first jack 41 lowers this piece 45 and the plate 39 pivotably connected thereto when a signal is received from the detector. The second jack 43 simultaneously forces the plate 39 to pivot.

Advantageously, a guide 15 consisting of a rigid tube is fixed to the frame downstream the pivoting plate. The guide 15 is fixed to the frame close to the cutting zone and is devised to engage the flank and hold it in folded position while the layer of fat is being cut.

As may be appreciated, the structure and operation of the loin puller 1 disclosed hereinabove make the trimming of the layer of fat much easier to carry out. As a result, one may obtain product of very high quality at a much higher speed. As a matter of fact, this speed can be similar to the one of the loin pullers presently used for processing loins having been subjected to Canadian cut.

Figure 7:
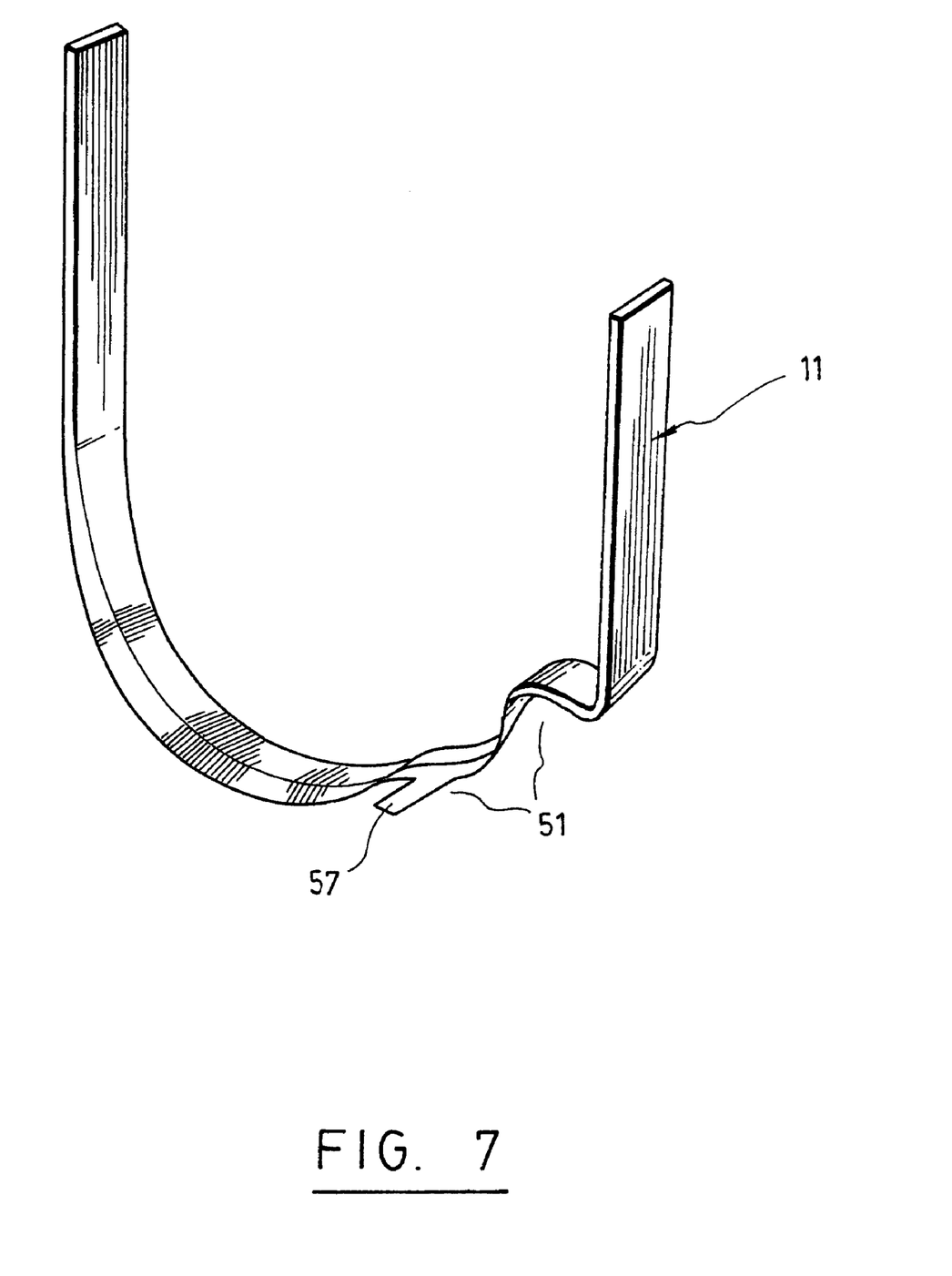
FIG. 7 is a perspective view of the cutting blade of the loin puller shown in FIG. 2.

It is obvious that numerous modifications could be made to the preferred embodiment that has just been disclosed hereinabove without departing from the scope of the invention. For example, to further improve the efficiency of the loin puller 1, the lateral side 5 of the working surface of concave cross-section on which extends the flank can have a lower height than the other opposite side. Moreover, as better shown in FIGS. 6 and 7, the arcuate blade 11 can be distorted to define recesses 51 adjacent to the side thereof where is located the flank "F" of the carcass-half, and means 53 operated by another detector 55 can be provided for automatically lowering and/or widening the blade 11 when the blade passes close to the end of the carcass-half where is located the blade bone and/or the other end where is located the tenderloin. The blade 11 can also have a projecting tooth or small blade 57 close to the recesses 51 to facilitate viewing of the blade travelling through the fat and to provide a lifting effect on the ribs.

It is worth noting that the carcass-halves can be fed into the loin puller according to the invention with their shoulder side first or with their ham side first.

It is worth noting also that the loin puller according to the invention may not necessarily be operating in a continuous manner, with the conveying system moving the carcass-halves at a constant speed. As a matter of fact, the loin puller according to the invention could be operating sequentially.

Moreover, some structural component thereof could be operating in a different manner. Thus, by way of non-restrictive example, the arcuate cutting blade could be moved through the loins to be processed instead of having said loins being conveyed to said cutting blade as was disclosed hereinabove.

What is claimed is:

1. In a loin puller for processing a carcass-half comprising a loin and a flank partially separated by scribing, said loin comprising a layer of fat of a given thickness to be trimmed off and lean meat adjacent said layer of fat, said loin puller comprising:

a frame;

an elongated rectilinear working surface fixed to the frame and intended to receive and support the loin of the carcass-half to be processed;

a conveying system mounted onto the frame above the working surface for engaging the loin, pressing said loin and moving said loin together with the flank connected thereto towards a cutting zone; and an arcuate cutting blade mounted to the frame in the cutting zone for engaging the loin when the same is moved by the conveying system and cutting the layer of fat to be trimmed off with or without lean meat on the trimmed fat attached to the flank;

the improvement wherein:

the frame is devised to leave a lateral free-space adjacent one side of the working surface, over the full length of the working surface, so as to let the flank fold down and hang from the working surface while the carcass-half is moved by the conveying system, whereby more visibility is left for an operator to evaluate an optimum cutting position for the cutting blade and more spacing is left between the cut ribs once the flank is folded down from the loin, thereby making the loin puller operable manually or automatically from any side and position along the frame.

2. The improved loin puller of claim 1, which further comprises means controlled by an operator for adjusting the cutting blade.

3. The improved loin puller of claim 1, which further comprises means controlled by a detection system for adjusting the cutting blade.

4. In a loin puller for processing a carcass-half comprising a loin and a flank partially separated by scribing, said loin comprising a layer of fat of a given thickness to be trimmed off and lean meat adjacent said layer of fat, said loin puller comprising:

a frame;
an elongated rectilinear working surface fixed to the frame and intended to receive and support the loin of the carcass-half to be processed;
a conveying system mounted onto the frame above the working surface for engaging the loin, pressing said loin and moving said loin together with the flank connected thereto towards a cutting zone; and
an arcuate cutting blade mounted to the frame in the cutting zone for engaging the loin when the same is moved by the conveying system and cutting the layer of fat to be trimmed off with or without lean meat on the trimmed fat attached to the flank;
the improvement wherein:
the frame is devised to let the flank fold down and hang from the working surface while the carcass-half is moved by the conveying system, whereby more visibility is left for an operator to evaluate an optimum cutting position for the cutting blade and more spacing is left between the cut ribs once the flank is folded down from the loin, thereby making the loin puller operable manually or automatically from any side and position along the frame; and
a guide is fixed to the frame and devised in such a manner as to contact the top portion of the flank while the carcass-half is moved by the conveying system and to hold said flank in folded position.

5. The improved loin puller of claim 4, wherein the guide is made of a rigid tube.

6. In a loin puller for processing a carcass-half comprising a loin and a flank partially separated by scribing, said loin comprising a layer of fat of a given thickness to be trimmed off and lean meat adjacent said layer of fat, said loin puller comprising:
a frame;
an elongated rectilinear working surface fixed to the frame and intended to receive and support the loin of the carcass-half to be processed;
a conveying system mounted onto the frame above the working surface for engaging the loin, pressing said loin and moving said loin together with the flank connected thereto towards a cutting zone; and
an arcuate cutting blade mounted to the frame in the cutting zone for engaging the loin when the same is moved by the conveying system and cutting the layer of fat to be trimmed off with or without lean meat on the trimmed fat attached to the flank;
the improvement wherein:
the frame is devised to let the flank fold down and hang from the working surface while the carcass-half is moved by the conveying system, whereby more visibility is left for an operator to evaluate an optimum cutting position for the cutting blade and more spacing is left between the cut ribs once the flank is folded down from the loin, thereby making the loin puller operable manually or automatically from any side and position along the frame; and
mechanical means are mounted upstream the arcuate cutting blade and are controlled by a detector for giving a knock onto the flank of the carcass-half while said carcass-half is moved by the conveying system, said knock forcing the flank to fold down and hang.

7. The improved loin puller of claim 6, wherein said mechanical means for giving a knock to the flank comprises a pivotable plate mounted onto the frame and at least one jack mounted between the plate and the frame for moving the plate down and folding it from an horizontal position down to an inclined position as soon as a signal is received from the detector.

8. In a loin puller for processing a carcass-half comprising a loin and a flank partially separated by scribing, said loin comprising a layer of fat of a given thickness to be trimmed off and lean meat adjacent said layer of fat, said loin puller comprising:
a frame;
an elongated rectilinear working surface fixed to the frame and intended to receive and support the loin of the carcass-half to be processed;
a conveying system mounted onto the frame above the working surface for engaging the loin, pressing said loin and moving said loin together with the flank connected thereto towards a cutting zone; and
an arcuate cutting blade mounted to the frame in the cutting zone for engaging the loin when the same is moved by the conveying system and cutting the layer of fat to be trimmed off with or without lean meat on the trimmed fat attached to the flank;
the improvement wherein:
the frame is devised to let the flank fold down and hang from the working surface while the carcass-half is moved by the conveying system, whereby more visibility is left for an operator to evaluate an optimum cutting position for the cutting blade and more spacing is left between the cut ribs once the flank is folded down from the loin, thereby making the loin puller operable manually or automatically from any side and position along the frame; and
said loin puller has an inlet and an outlet and further comprises:
an inlet conveyor comprising an endless chain provided with teeth, said inlet conveyor being positioned at the inlet of the loin puller for supporting the flank when the carcass-half enters the loin puller;
a guiding rod also positioned at the inlet of the loin puller for facilitating positioning of the carcass-half onto the working surface; and
an outlet conveyor also comprising an endless chain provided with teeth, said outlet conveyor being positioned at the outlet of the loin puller for lifting up the flank and supporting the same when said carcass-half exits the loin puller.

9. The improved loin puller of claim 8, wherein the guiding rod consists of an horizontally extending rigid tube connected by means of pivoting arms to the frame in order to be able to retract in a vertical plane.

10. The improved loin puller of claim 8, further comprising a guiding plate mounted in a rigid manner to the frame above the inlet conveyor just downstream the same, said guiding plate extending at an angle in order to start folding the flank of the carcass-half while said carcass-half is moved by the conveying system.

11. The improved loin puller of claim 1, wherein:
the working surface has a concave cross-section;
an endless belt is mounted onto said working surface; and
retractable rollers are fixed onto the frame above the belt for applying a pressure thereto and thus for maintaining said belt in contact with the working surface before and after passage of the carcass-half.

12. The improved loin puller of claim 11, wherein the working surface of concave cross-section has two lateral sides and the lateral side of said the working surface on which extends the flank, is of a lower height than the other.

13. In a loin puller for processing a carcass-half comprising a loin and a flank partially separated by scribing, said loin comprising a layer of fat of a given thickness to be trimmed off and lean meat adjacent said layer of fat, said loin puller comprising:

a frame;

an elongated rectilinear working surface fixed to the frame and intended to receive and support the loin of the carcass-half to be processed;

a conveying system mounted onto the frame above the working surface for engaging the loin, pressing said loin and moving said loin together with the flank connected thereto towards a cutting zone; and an arcuate cutting blade mounted to the frame in the cutting zone for engaging the loin when the same is moved by the conveying system and cutting the layer of fat to be trimmed off with or without lean meat on the trimmed fat attached to the flank;

the improvement wherein:

the frame is devised to let the flank fold down and hang from the working surface while the carcass-half is moved by the conveying system, whereby more visibility is left for an operator to evaluate an optimum cutting position for the cutting blade and more spacing is left between the cut ribs once the flank is folded down from the loin, thereby making the loin puller operable manually or automatically from any side and position along the frame;

the arcuate blade is distorted to define recesses adjacent to the side thereof where is located the flank of the carcass-half, and means operated by another detector are provided for automatically opening and/or widening the blade.

14. The improved loin puller of claim 13, wherein the knife is provided with a projecting tooth or blade located slightly below the recess of the knife.

15. In a method for processing a carcass-half comprising a loin and a flank partially separated by scribing, said loin comprising a layer of fat of a given thickness to be trimmed off and lean meat adjacent said layer of fat, said method comprising the steps of:

positioning the carcass-half to be processed onto a working surface;

moving said carcass-half toward a cutting zone along said working surface by means of a conveying system; and cutting the layer of fat to be trimmed off the loin with or without lean meat on the trimmed fat attached to the flank by means of an arcuate cutting blade located in the cutting zone above the working surface;

the improvement wherein:

prior to cutting the layer of fat with or without said lean meat, the flank is allowed to fold down and hang from the working surface whereby more visibility is left for an operator to evaluate an optimum cutting position for the cutting blade and more spacing is left between the cut ribs once the flank is folded down from the loin, thereby making the loin puller operable manually or automatically from any side and position along the frame.

16. The improved method of claim 15, wherein the flank is forced to fold down by engagement under a guide made of a rigid tube.

17. The improved method of claim 15, wherein the flank is forced to fold down by application of a knock onto the flank by means of a foldable plate.

* * * * *